United States Patent
Takeda (10) Patent No.: US 10,521,673 B2
(45) Date of Patent: Dec. 31, 2019

(54) COUNTING PERSONS IN QUEUE SYSTEM, APPARATUS, METHOD, AND STORAGE MEDIUM

(71) Applicant: CANON KABUSHIKI KAISHA, Tokyo (JP)

(72) Inventor: Kanako Takeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 5 days.

(21) Appl. No.: 15/687,935

(22) Filed: Aug. 28, 2017

(65) Prior Publication Data

US 2018/0060672 A1    Mar. 1, 2018

(30) Foreign Application Priority Data

Aug. 30, 2016  (JP) ................ 2016-168266

(51) Int. Cl.
*G06K 9/00* (2006.01)
*G06K 9/78* (2006.01)
*G07C 11/00* (2006.01)
*G06T 7/73* (2017.01)
*G06K 9/20* (2006.01)

(52) U.S. Cl.
CPC ..... *G06K 9/00771* (2013.01); *G06K 9/00362* (2013.01); *G06K 9/78* (2013.01); *G06T 7/74* (2017.01); *G06K 9/00624* (2013.01); *G06K 9/209* (2013.01); *G06T 2207/30196* (2013.01); *G06T 2207/30232* (2013.01); *G06T 2207/30242* (2013.01); *G07C 2011/04* (2013.01)

(58) Field of Classification Search
CPC ........... G06K 9/00771; G06K 9/00778; G06K 9/00221; G06K 9/00362; G06K 9/78; G06K 9/209; G06K 9/00624; G06T 2207/30196; G06T 2207/30232; G06T 2207/30242; G07C 2011/04
See application file for complete search history.

(56) References Cited

U.S. PATENT DOCUMENTS

| 2004/0091134 | A1  | 5/2004  | Long |
| 2006/0269103 | A1  | 11/2006 | Brown |
| 2010/0177963 | A1* | 7/2010  | Yokomitsu ............ B61L 23/00 382/170 |
| 2011/0231419 | A1  | 9/2011  | Papke |
| 2015/0324647 | A1  | 11/2015 | Wuethrich |
| 2016/0191865 | A1* | 6/2016  | Beiser ............... G06K 9/00221 348/156 |

FOREIGN PATENT DOCUMENTS

| JP | 2008-217289 A | 9/2008 |
| JP | 4432382 B2    | 3/2010 |

* cited by examiner

*Primary Examiner* — Kenny A Cese
(74) *Attorney, Agent, or Firm* — Canon U.S.A., Inc. IP Division (57) ABSTRACT

A system that detects the number of persons waiting in a queue includes an image acquisition unit that acquires a captured image, an analysis unit that detects a person from the captured image, and a decision unit that, when a region in which no person is detected in the captured image has an area greater than or equal to a predetermined area, sets the number of persons detected from the captured image as the number of persons waiting in the queue.

12 Claims, 8 Drawing Sheets

COUNTING PERSONS IN QUEUE SYSTEM, APPARATUS, METHOD, AND STORAGE MEDIUM

BACKGROUND

Field

The present disclosure relates to a system, an information processing apparatus, an information processing method, and a program.

Description of the Related Art

Conventionally, there has been a system that counts the number of persons staying in a room based on the number of persons passing through an entrance and an exit. For example, Japanese Patent Laid-Open No. 2008-217289 discloses a system that calculates the number of persons entering a room and the number of persons exiting the room by checking entering and exiting directions of persons, and uses values thereof to count the number of persons staying in the room.

Japanese Patent No. 4432382 discloses a system in which the number of persons staying is calculated based on the number of persons entering and the number of persons exiting. When the number of persons staying exceeds a predetermined number of persons, the number of persons staying is returned to an initial value to make correction.

By using the technique disclosed in Japanese Patent Laid-Open No. 2008-217289 described above, the number of persons in a queue can be calculated based on the number of persons passing through an entrance and an exit. By using the technique disclosed in Japanese Patent No. 4432382, when the number of persons waiting in a queue exceeds a predetermined number of persons set in advance, the number of persons waiting in the queue can be returned to an initial value that is set in advance.

SUMMARY

The present disclosure provides a system that detects a number of persons waiting in a queue including an image acquisition unit configured to acquire a captured image, an analysis unit configured to detect a person from the captured image, and a decision unit configured to, when a region in which no person is detected in the captured image has an area greater than or equal to a predetermined area, set a number of persons detected from the captured image as the number of persons waiting in the queue.

Further features will become apparent from the following description of exemplary embodiments with reference to the attached drawings.

DESCRIPTION OF THE EMBODIMENTS

Embodiments will be described below with reference to drawings.

Description will be given for information processing in which in a system that counts the number of persons in a queue by performing passage detection at an exit and an entrance of the queue. The number of persons waiting in the queue is properly corrected or decided when the correct number of persons in the queue is not known, for example, because persons enter or exit the queue via some location other than the entrance or the exit.

Figure 1:
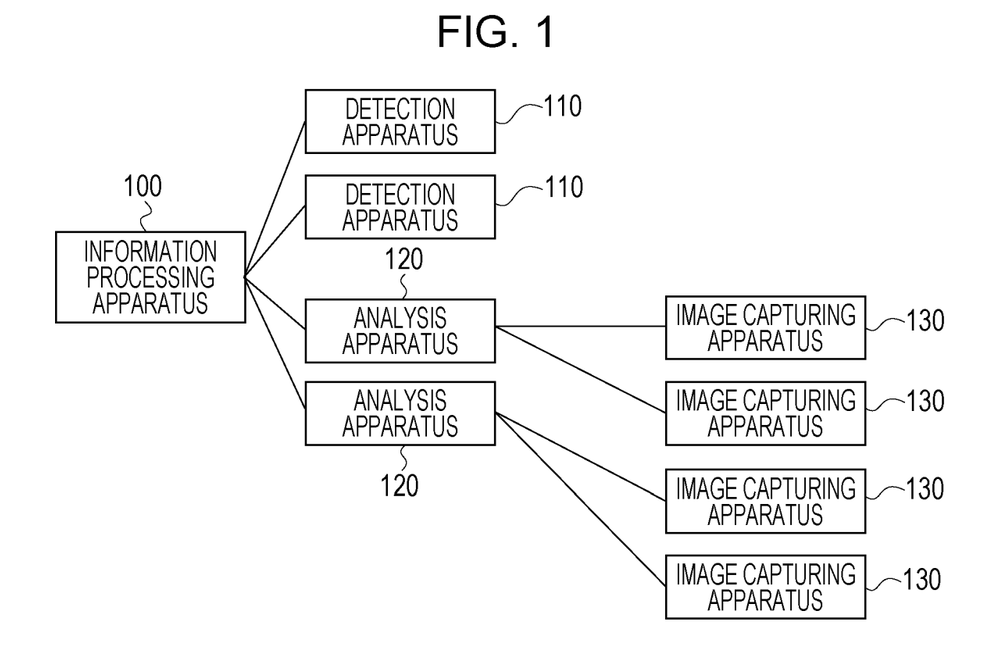
FIG. 1 illustrates an example of a system configuration of an information processing system.

FIG. 1 illustrates an example of a system configuration of an information processing system. The information processing system includes at least one information processing apparatus 100 that calculates the number of persons waiting in a queue, a plurality of detection apparatuses 110, a plurality of analysis apparatuses 120, and a plurality of image capturing apparatuses 130.

Each of the image capturing apparatuses 130 is, for example, a network camera, and there may be at least one or more image capturing apparatuses 130. The image capturing apparatus 130 captures an image of a range including a vicinity of an exit of the queue. Each of the detection apparatuses 110 is, for example, a camera or the like, that includes an image analysis function of detecting passage of a human body by an image or a passage sensor or the like that uses infrared radiation or the like. There can be at least one or more detection apparatuses 110 at each entrance and the exit.

Alternatively, the detection apparatus 110 can be software for performing passage detection by a video image acquired by a camera. In such a case, the detection apparatus 110 can perform processing for images of the entrance and the exit. When the detection apparatus 110 is implemented as software in the information processing system, for example, a program according to a function of the detection apparatus 110 is installed in a HDD 204 of the information processing apparatus 100 or the like. For convenience of description, the following embodiment is described by assuming that the detection apparatus 110 is implemented as a hardware apparatus in the information processing system separately from the information processing apparatus 100.

Each of the analysis apparatuses 120 is, for example, an analysis apparatus that analyzes an image obtained from the image capturing apparatus 130 and detects a human body. The analysis apparatus 120 can be embedded in the image capturing apparatus 130 or can be connected to the image capturing apparatus 130 via a network. The analysis apparatus 120 can be connected to a plurality of image capturing apparatuses 130 via the network. There can be at least one or more analysis apparatuses 120 in the information processing system.

The information processing apparatus 100 calculates the number of persons waiting in the queue based on information obtained from either or both the detection apparatus 110 and the analysis apparatus 120.

Since the information processing system of the present embodiment is mainly used for monitoring work, one to several hundred image capturing apparatuses 130 can be used.

Figure 2:
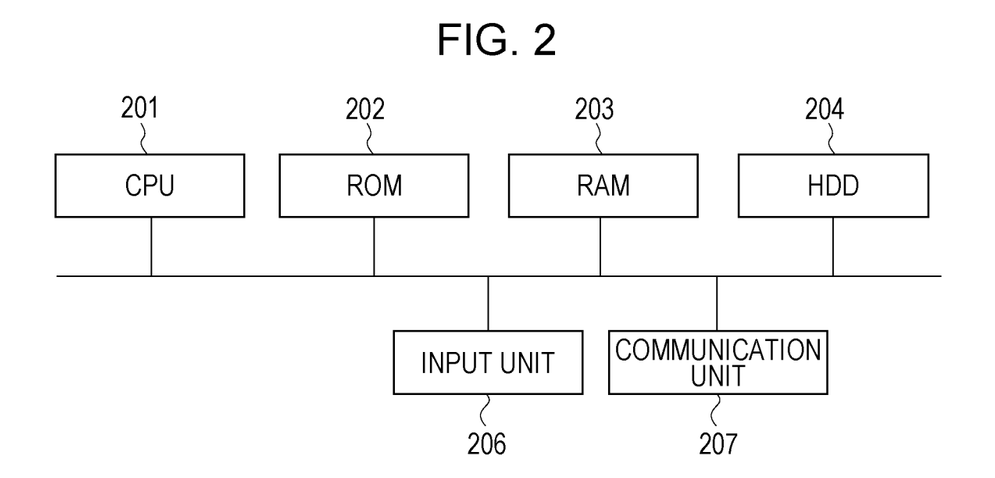
FIG. 2 illustrates an example of a hardware configuration of an information processing apparatus.

FIG. 2 illustrates an example of a hardware configuration of the information processing apparatus 100.

The information processing apparatus 100 includes, as the hardware configuration, a CPU 201, a ROM 202, a RAM 203, the HDD 204, an input unit 206, and a communication unit 207. The CPU 201 reads out a program stored in the ROM 202 or the HDD 204 and executes various types of processing. The RAM 203 is used as a temporary storage area such as a main memory or a working area of the CPU 201. A boot program or the like is stored in the ROM 202. Image data, various programs, various types of information, or the like is stored in the HDD 204.

The input unit 206 inputs information to the information processing apparatus 100. The communication unit 207 connects the information processing apparatus 100 to another apparatus in a wired or wireless manner. When the CPU 201 reads out a program stored in the ROM 202 or the HDD 204 and executes processing, a software configuration of FIG. 3 described below and processing by the information processing apparatus 100 in flowcharts of FIGS. 5, 9, and 11 described below are realized.

Each of the detection apparatus 110, the analysis apparatus 120, and the image capturing apparatus 130 also includes a CPU, a memory, a communication unit, and the like as at least a hardware configuration. When a CPU of each of the apparatuses executes processing based on a program stored in a memory of the apparatus, a function of the apparatus is realized.

Figure 3:
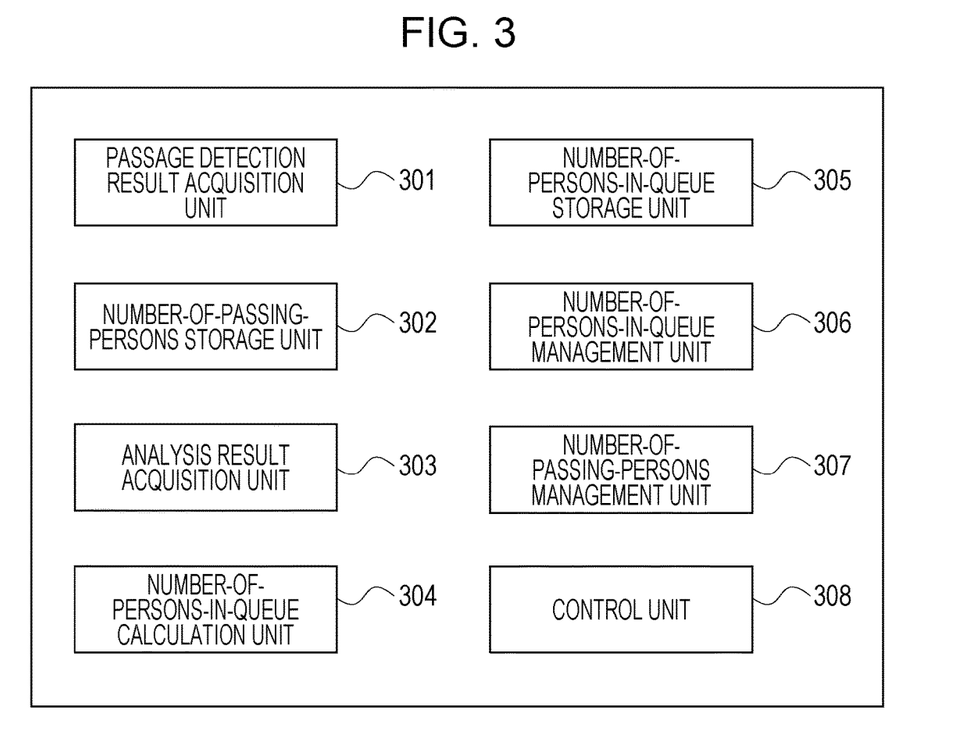
FIG. 3 illustrates an example of a software configuration of the information processing apparatus.

FIG. 3 illustrates an example of the software configuration of the information processing apparatus 100. The information processing apparatus 100 includes, as the software configuration, a passage detection result acquisition unit 301, a number-of-passing-persons storage unit 302, a number-of-persons-in-queue calculation unit 304, an analysis result acquisition unit 303, a number-of-persons-in-queue storage unit 305, a number-of-persons-in-queue management unit 306, a number-of-passing-persons management unit 307, and a control unit 308.

The passage detection result acquisition unit 301 receives, via the communication unit 207, information transmitted by the detection apparatus 110. Each time passage detection occurs at an exit or entrance of the queue, the passage detection result acquisition unit 301 acquires the number of passing persons and transmits the acquired information to the number-of-passing-persons storage unit 302. The number-of-passing-persons storage unit 302 stores, in the HDD 204 or the like, information about the number of persons passing through the entrance and the exit of the queue and passage times thereof, which is received from the passage detection result acquisition unit 301. Processing of the passage detection result acquisition unit 301 is an example of processing of time acquisition.

The analysis result acquisition unit 303 acquires a person detection result as a result of analysis of the analysis apparatus 120 for an image acquired by the image capturing apparatus 130. The number-of-persons-in-queue calculation unit 304 calculates the number of persons in the queue based on the information of the number of persons passing through the entrance and the exit of the queue, which is stored in the HDD 204 or the like by the number-of-passing-persons storage unit 302, and an initial value of the number of persons in the queue, which is stored in the HDD 204 or the like by the number-of-persons-in-queue storage unit 305. The initial value of the number of persons in the queue is set when the system starts and is stored in the HDD 204 or the like by the number-of-persons-in-queue storage unit 305. After the system starts, the initial value of the number of persons in the queue is updated by the number-of-persons-in-queue management unit 306.

The number of persons in the queue is calculated as follows:

Number of persons in queue=number of persons passing through entrance−number of persons passing through exit+initial value of number of persons in queue      (formula)

Each time the number of passing persons, which is stored in the HDD 204 or the like via the number-of-passing-persons storage unit 302, is updated, the number-of-persons-in-queue calculation unit 304 calculates the number of persons in the queue again by using the above formula. The number-of-persons-in-queue storage unit 305 stores, in the HDD 204 or the like, the information of the number of persons in the queue and the initial value of the number of persons in the queue. A value of the number of persons in the queue, which is stored in the HDD 204 or the like by the number-of-persons-in-queue storage unit 305, is updated by the number-of-persons-in-queue management unit 306.

The number-of-persons-in-queue management unit 306 performs processing for properly correcting the number of persons in the queue. The number-of-persons-in-queue management unit 306 determines a region in which a person is detected and a region in which no person is detected based on the person detection result obtained by the analysis result acquisition unit 303 and updates the initial value of the number of persons in the queue, which is stored in the HDD 204 or the like by the number-of-persons-in-queue storage unit 305, in accordance with a result of the determination. At the same time, the number-of-persons-in-queue management unit 306 updates the number of passing persons, which is stored in the HDD 204 or the like by the number-of-passing-persons storage unit 302, to 0.

The control unit 308 controls each of the units as the software configuration of the information processing apparatus 100.

Figure 4:
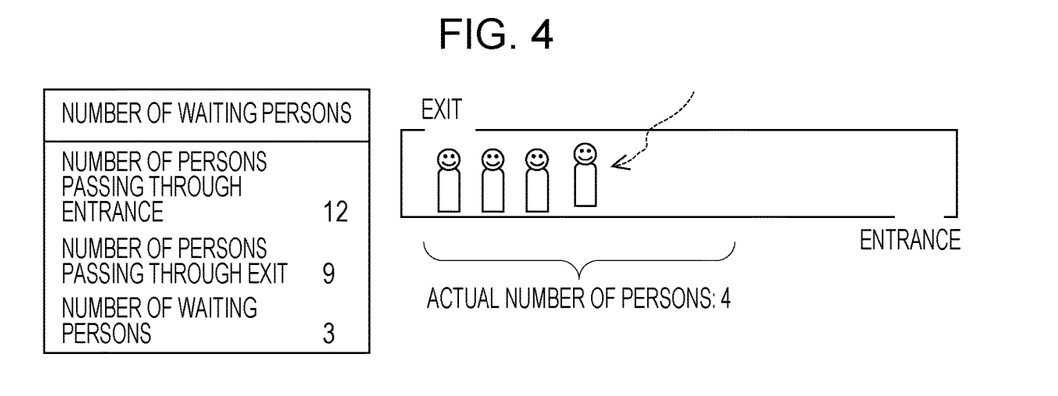
FIG. 4 illustrates an example of calculation of the number of waiting persons.

FIG. 4 illustrates an example of calculation of the number of waiting persons when there is one person waiting in the queue without passing through the entrance of the queue. In such a case, a difference between the number of persons passing through the entrance and the number of persons passing through the exit is 3 and a calculation value of the number of persons in the queue is 3. However, the number of waiting persons is actually 4 and the correct number of persons is not known.

Information processing for correcting the number of persons in the queue to the correct number when the correct number of persons in the queue is not known as illustrated in FIG. 4 will be described below with reference to FIG. 5.

Figure 5:
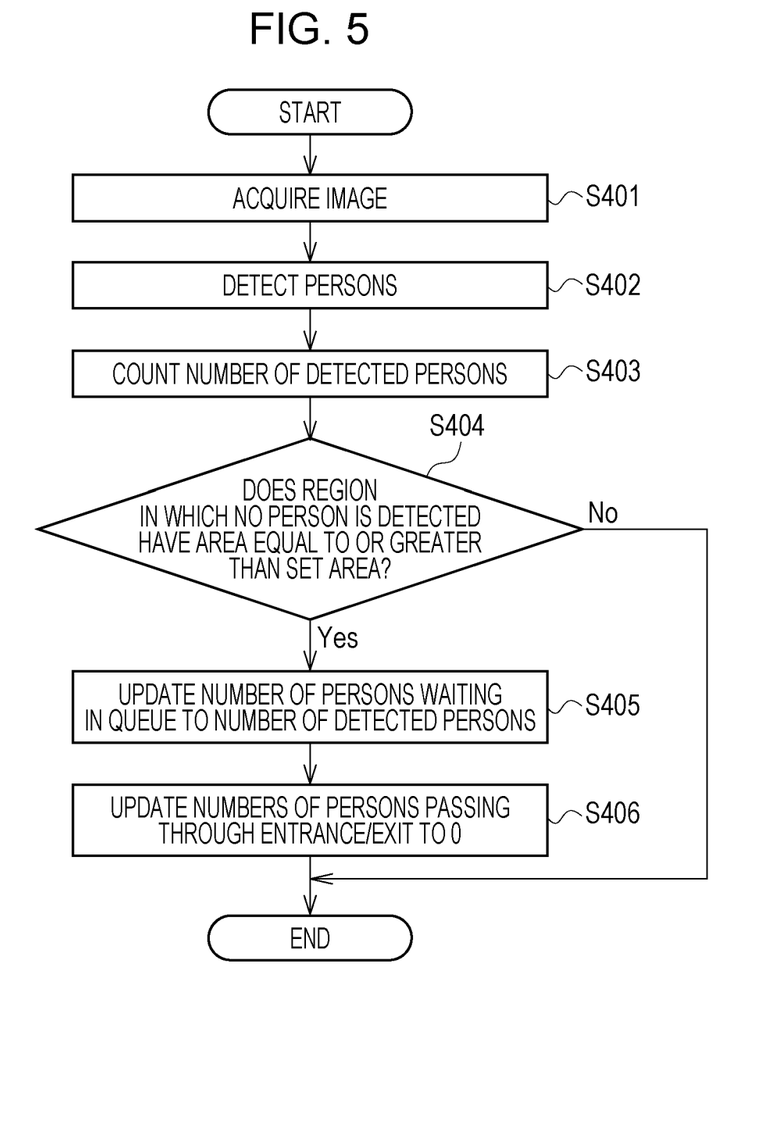
FIG. 5 is a flowchart illustrating an example of information processing.
Figure 6:
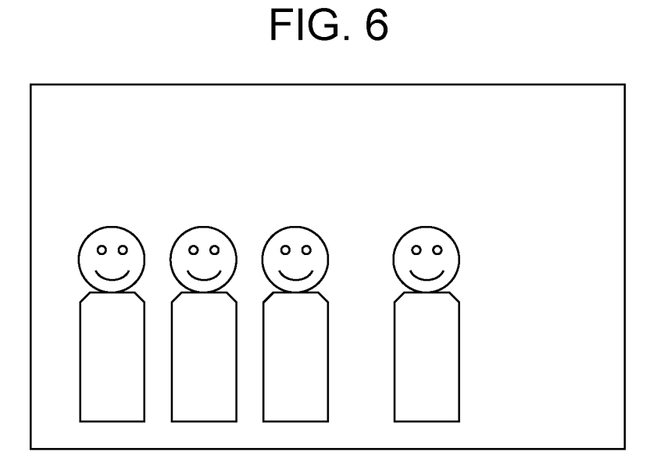
FIG. 6 illustrates an example of an image obtained by performing image capturing of a situation of a queue of FIG. 4.

At S401, the analysis apparatus 120 acquires an image of the queue, as illustrated in FIG. 6, from the image capturing apparatus 130. FIG. 6 illustrates an example of an image obtained by imaging a situation of the queue of FIG. 4. Processing of S401 is an example of processing of image acquisition for acquiring the captured image of the queue.

Figure 7:
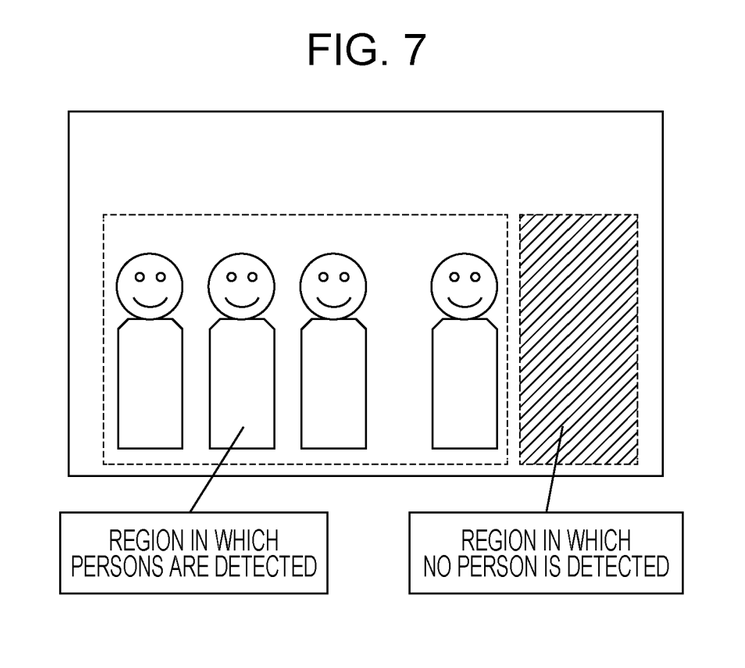
FIG. 7 illustrates an example when the image of FIG. 6 is analyzed by an analysis apparatus.

At S402, the analysis apparatus 120 analyzes the image acquired at S401 and detects persons. FIG. 7 illustrates an example when the image of FIG. 6 is analyzed by the analysis apparatus 120. As illustrated in FIG. 7, the analysis apparatus 120 detects persons in the image and acquires a region in which the persons are detected and a region in which no person is detected.

At S403, the analysis apparatus 120 counts the number of detected persons from the region acquired at S402. The analysis apparatus 120 transmits, to the information processing apparatus 100 as the analysis result, information about the region(s) acquired at S402 and the number of detected persons counted at S403. The analysis apparatus 120 can transmit results of processing of S402 and S403 altogether to the information processing apparatus 100 as the analysis result or transmit the results separately to the information processing apparatus 100 as the analysis result of the same image. Description is provided below by assuming that the analysis apparatus 120 transmits the analysis result altogether. The analysis result acquisition unit 303 of the information processing apparatus 100 acquires the analysis result transmitted from the analysis apparatus 120.

At S404, based on the analysis result acquired by the analysis result acquisition unit 303, the control unit 308 determines whether the region in which no person is detected has an area greater than or equal to an area that is set in advance.

When determining that the region in which no person is detected has an area greater than or equal to the set area (Yes at S404), the control unit 308 proceeds to S405. When determining that the region in which no person is detected does not have an area greater than or equal to the set area (No at S404), the control unit 308 ends the processing of the flowchart illustrated in FIG. 5.

When the region in which no person is detected as the analysis result has an area greater than or equal to the set area, the number of persons detected in the captured image can be specified as the number of persons in the queue.

At S405, the number-of-persons-in-queue calculation unit 304 sets the number of detected persons, which is included in the analysis result, as the number of persons waiting in the queue (the initial value of the number of persons in the queue). The number-of-persons-in-queue management unit 306 updates the initial value of the number of persons in the queue, which is stored in the HDD 204 or the like by the number-of-persons-in-queue storage unit 305, to the initial value of the number of persons in the queue, which is obtained by the number-of-persons-in-queue calculation unit 304.

At S406, the number-of-passing-persons management unit 307 sets the number of persons passing through the entrance and the number of persons passing through the exit, which are stored in the HDD 204 via the number-of-passing-persons storage unit 302, to 0.

When a predetermined time period has lapsed after the processing of the flowchart of FIG. 5 ends, the information processing system starts the processing from S401 again. A processing interval can be any value and the processing can start, for example, when passage through the exit or entrance of the queue occurs. The processing of S405 or the processing of S405 and S406 is an example of processing of decision.

Figure 8:
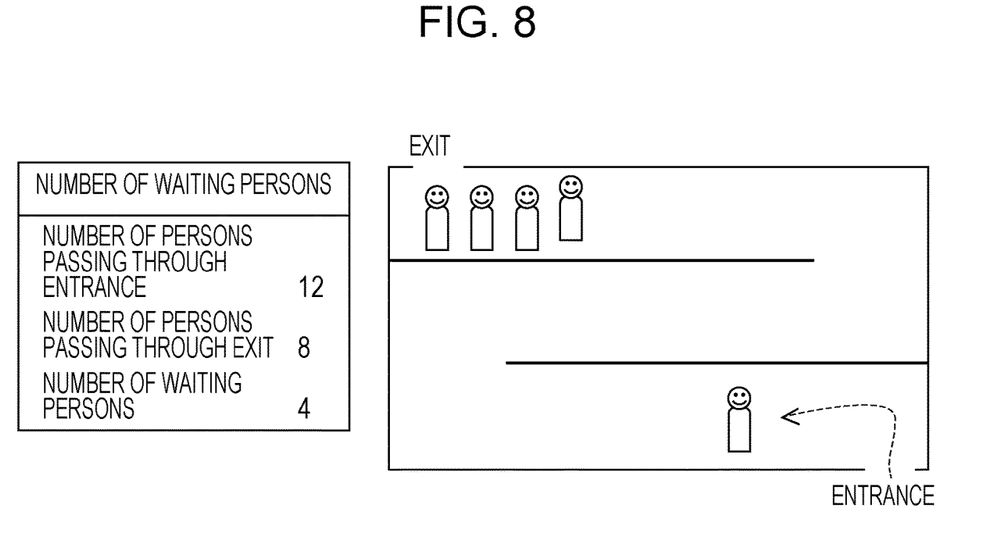
FIG. 8 illustrates an example of calculation of the number of waiting persons.

FIG. 8 illustrates an example of calculation of the number of waiting persons when a distance from the entrance to the exit in the queue is long. In the example of FIG. 8, the number of persons is calculated correctly.

Information processing for correcting the number of persons in the queue to the correct number in a case where the correct number of persons is not known when the distance from the entrance to the exit in the queue is long will be described with reference to FIG. 9.

Figure 9:
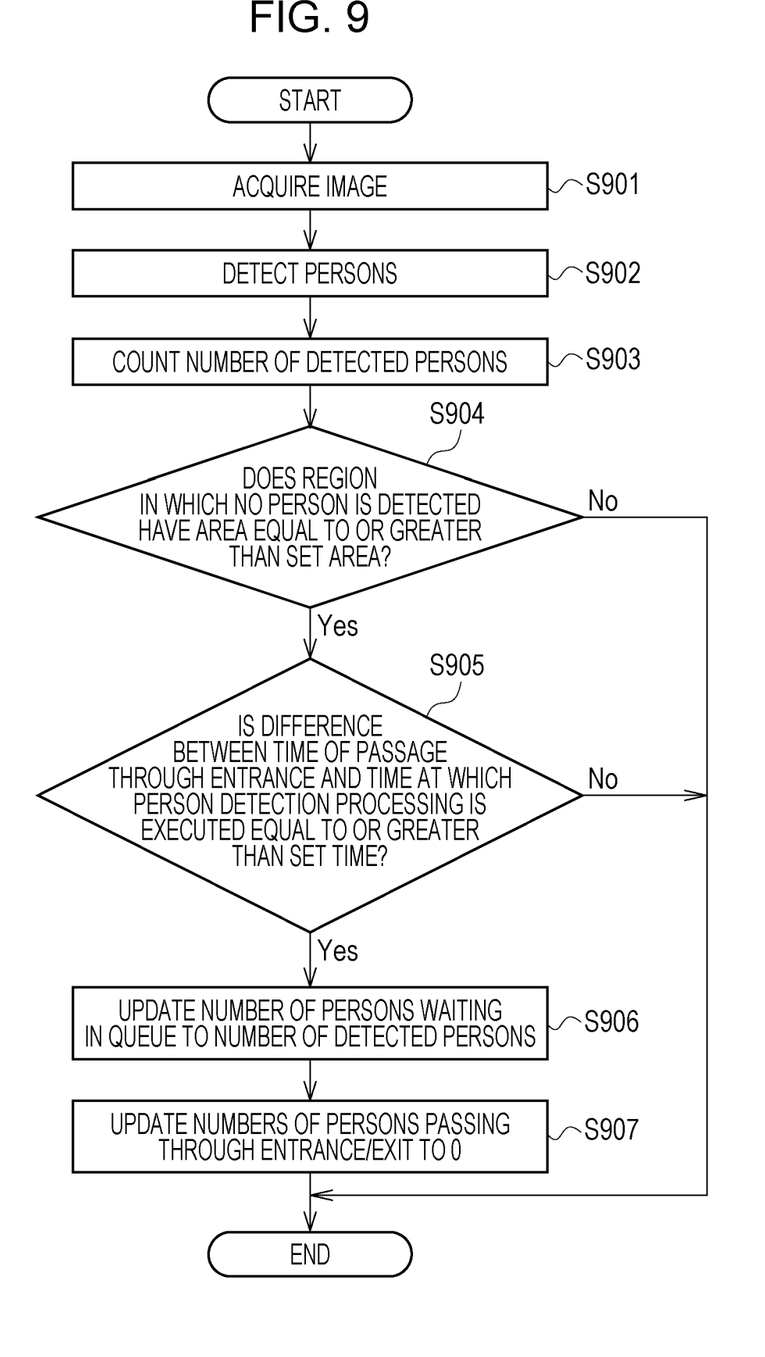
FIG. 9 is a flowchart illustrating an example of information processing.

A difference in the processing of FIG. 9 from the processing of FIG. 5 is determination performed by counting the number of detected persons and updating the number of persons in the queue to the number of detected persons. In the processing of FIG. 9, when a region in which no person is detected has an area (magnitude) greater than or equal to a predetermined area, and when a difference between time at which passage through the entrance is detected and time at which a person is detected is greater than or equal to a set time, the number of persons in the queue is corrected.

Since processing from S901 to S904 is similar to the processing from S401 to S404 of FIG. 5, description thereof will be omitted and description of FIG. 9 will be start from the processing of S905. When Yes is determined at S904, the processing of S905 is performed.

At S905, the control unit 308 compares time of previous passage through the entrance, which is stored in the HDD 204 or the like via the number-of-passing-persons storage unit 302, to time at which person detection processing of S902 is performed, and determines whether a difference therebetween is greater than or equal to a set time. Here, it is assumed that, for example, the information processing apparatus 100 also acquires, from the analysis apparatus 120 as the analysis result, information of time at which person detection processing is executed.

When determining that the difference is greater than or equal to the set time (Yes at S905), the control unit 308 proceeds to S906. When determining that the difference is not equal greater than or equal to the set time (No at S905), the control unit 308 ends the processing of the flowchart illustrated in FIG. 9. As the set time used for the determination of S905, the control unit 308 can use a predicted time required for moving from the entrance of the queue to the end of the queue, an average interval of passage through the entrance, or a maximum interval of passage through the entrance. When the difference between the time of previous passage through the entrance and the time at which the person detection processing is executed is greater than or equal to the set time, persons who have passed through the entrance in the previous time reach the end of the queue and the number of persons who are in an imaged range can be specified as the number of persons in the queue.

At S906, the number-of-persons-in-queue calculation unit 304 sets the number of detected persons, which is included in the analysis result, as the number of persons waiting in the queue (the initial value of the number of persons in the queue). The number-of-persons-in-queue management unit 306 updates the initial value of the number of persons in the queue, which is stored in the HDD 204 or the like by the number-of-persons-in-queue storage unit 305, to the initial value of the number of persons in the queue, which is obtained by the number-of-persons-in-queue calculation unit 304.

At S907, the number-of-passing-persons management unit 307 sets the number of persons passing through the entrance and the number of persons passing through the exit, which are stored in the HDD 204 via the number-of-passing-persons storage unit 302, to 0.

When a predetermined time period has lapsed after the processing of the flowchart of FIG. 9 ends, the information processing system starts the processing from S901 again. A processing interval can be any value and the processing can start, for example, when passage through the exit or entrance of the queue occurs. The processing of S906 or the processing of S906 and S907 is an example of processing of decision.

Figure 10:
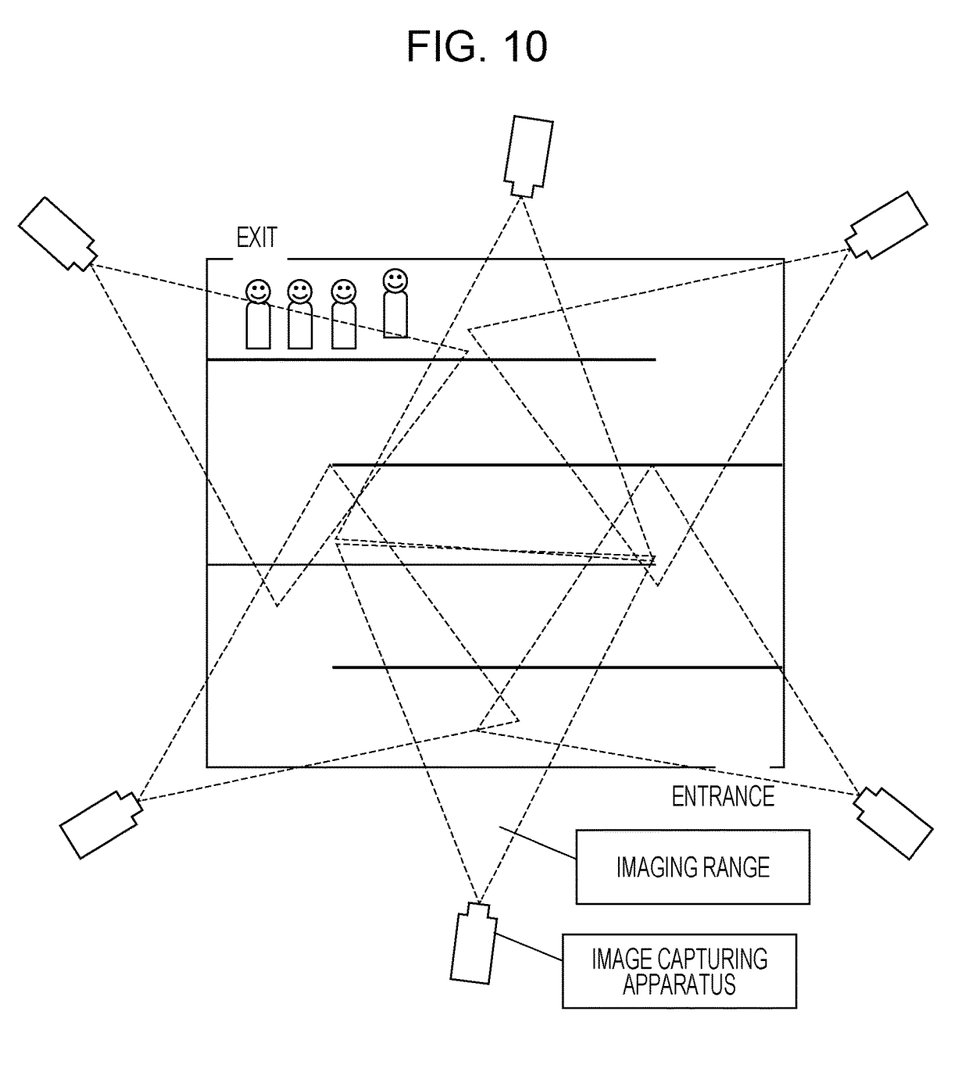
FIG. 10 illustrates an example of imaging ranges by a plurality of image capturing apparatuses.

Next, information processing in which, in a case where a plurality of image capturing apparatuses 130, such as network cameras, are arranged near the queue as illustrated in FIG. 10 and can perform image capturing of portions of the queue, the number of persons is corrected to the correct number when the correct number of persons is not known.

Figure 11:
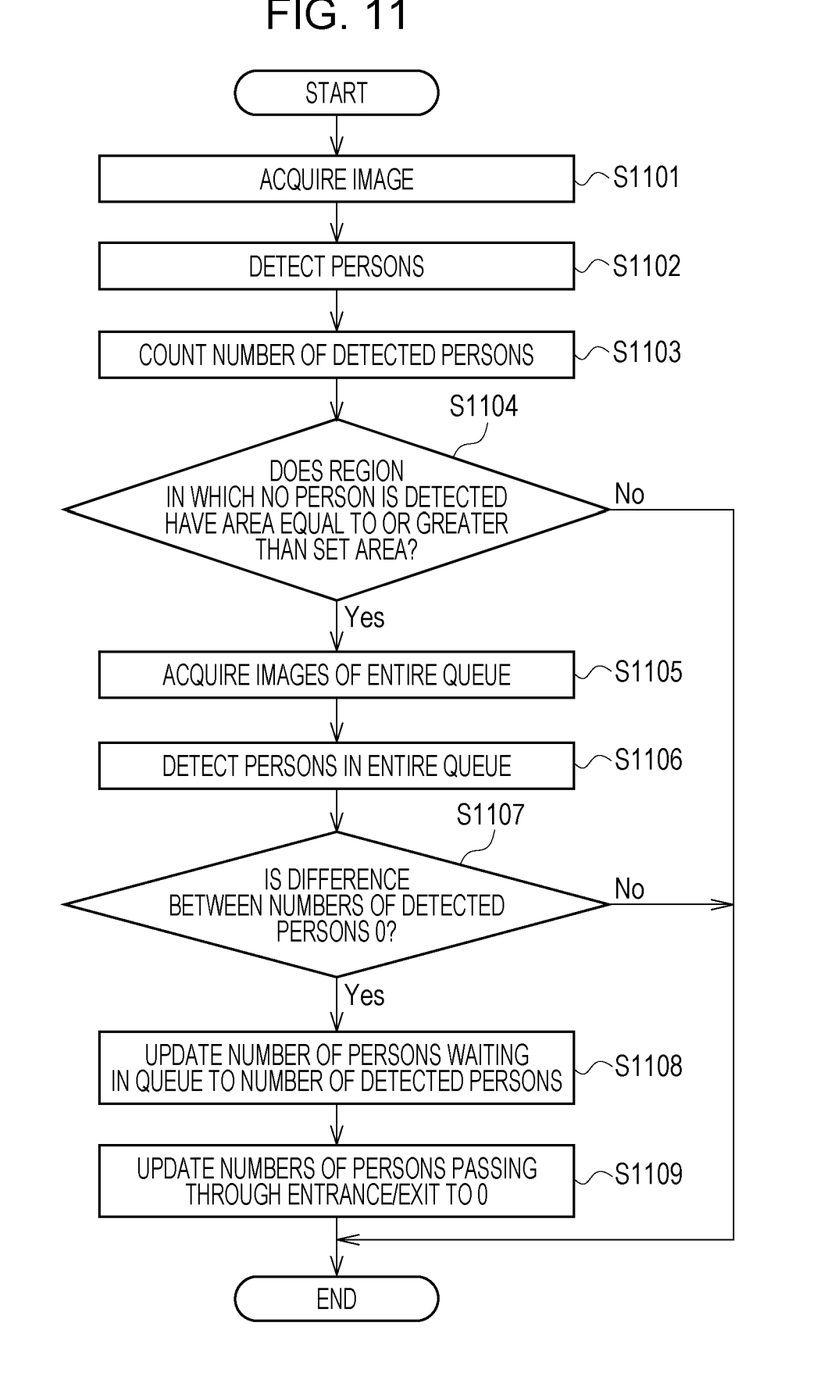
FIG. 11 is a flowchart illustrating an example of information processing.

FIG. 11 illustrates the flow of the processing. A difference between the processing of FIG. 11 and the processing of FIG. 5 is the processing of S1105 to S1107. In the processing of FIG. 11, in a case where a region in which no person is detected has an area greater than or equal to a fixed area, and in a case where a difference between the number of persons detected at S1103 and the number of detected persons in the entire queue when imaging capturing is performed by a plurality of cameras that can perform image capturing of the entire queue is 0, the number of persons in the queue is corrected.

Since processing from S1101 to S1104 is similar to the processing from S401 to S404 of FIG. 5, description thereof will be omitted and description of the processing of FIG. 11 will be started from the processing of S1105. When Yes is determined at S1104, the processing of S1105 is performed.

At S1105, image capturing of the entire queue is performed by a plurality of image capturing apparatuses 130 performing image capturing of the entire queue. In this case, timing when the plurality of image capturing apparatuses 130 perform image capturing of the entire queue is not limited to the timing of S1105. The plurality of image capturing apparatuses 130 can perform image capturing of the entire queue when processing of FIG. 11 starts or perform image capturing of the entire queue when a part of the queue is subjected to image capturing at S1101. However, in a case where image capturing of the entire queue is performed when the processing of S1105 starts, the plurality of image capturing apparatuses 130 perform image capturing of the entire queue based on an image capturing request or the like from the control unit 308. The plurality of image capturing apparatuses 130 transmit captured images to the analysis apparatus 120.

At S1106, the analysis result acquisition unit 303 acquires a result of person detection from the analysis apparatus 120. At S1107, the control unit 308 compares the total number of detected persons, which is included in the result of person detection acquired by the analysis result acquisition unit 303 at S1106, to the number of detected persons acquired at S1103 and determines whether a difference between the numbers of detected persons is 0.

When determining that the difference between the numbers of detected persons is 0 (Yes at S1107), the control unit 308 proceeds to S1108. When determining that the difference between the numbers of detected persons is not 0 (No at S1107), the control unit 308 ends the processing of the flowchart illustrated in FIG. 11.

In the processing of S1107, based on the result of person detection acquired by the analysis result acquisition unit 303 at S1106, the control unit 308 can determine whether the number of detected persons in images captured by image capturing apparatuses other than the image capturing apparatus that has acquired the image at S1101 is 0. In a case where determination is performed in this manner, the control unit 308 proceeds to S1108 when the number of detected persons in images captured by image capturing apparatuses other than the image capturing apparatus that has acquired the image at S1101 is 0, and ends the processing of the flowchart illustrated in FIG. 11 when it is not 0.

At S1108, the number-of-persons-in-queue calculation unit 304 sets the number of detected persons, which is acquired at S1103, as the number of persons waiting in the queue (the initial value of the number of persons in the queue). The number-of-persons-in-queue management unit 306 updates the initial value of the number of persons in the queue, which is stored in the HDD 204 or the like by the number-of-persons-in-queue storage unit 305, to the initial value of the number of persons in the queue, which is obtained by the number-of-persons-in-queue calculation unit 304.

At S1109, the number-of-passing-persons management unit 307 sets the number of persons passing through the entrance and the number of persons passing through the exit, which are stored in the HDD 204 via the number-of-passing-persons storage unit 302, to 0.

When a predetermined time period has lapsed after the processing of the flowchart of FIG. 11 ends, the information processing system starts the processing from S1101 again. A processing interval can be any value and the processing can start, for example, when passage through the exit or entrance of the queue occurs. The processing of S1108 or the processing of S1108 and S1109 is an example of processing of decision.

<Other Embodiments>

A program for implementing at least one of the above-described functions of the embodiment can be supplied to a system or apparatus via a network or storage medium. The above-described functions can also be achieved by processing in which at least one processor in a computer of the system or apparatus reads and executes the program. At least one of the above-described functions can also be achieved by a circuit (for example, an ASIC).

While embodiments have been described above, these embodiments are not seen to be limiting. A part or the entire software configuration of FIG. 3 described above can be included in the information processing apparatus 100 as the hardware configuration. The system configuration of FIG. 1 described above is an example, and the information processing apparatus 100 and the analysis apparatus 120 can, for example, be integrated with each other.

According to the processing of the embodiments described above, even when persons enter or exit from a queue though a location other than an entrance or exit, it is possible to properly correct or decide the number of persons in the queue.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-168266 filed Aug. 30, 2016, which is hereby incorporated by reference herein in its entirety.

What is claimed is:

1. A system that determines a number of persons waiting in a queue formed between a first position and a second position, the second position corresponding to an exit of the queue, the system comprising a computer executing instructions that, when executed by the computer, cause the computer to function as:
   an image obtaining unit configured to obtain a captured image of an area corresponding to the second position;
   a first detection unit configured to detect a person passing through the first position;
   a second detection unit configured to detect a person passing through the second position;
   a third detection unit configured to detect a person from the captured image and to determine, in the captured image, a first region including a detected person and a second region including no person; and
   a determination unit configured to, if the second region has an area greater than or equal to a predetermined area, determine a number of detected persons in the first region as the number of persons waiting in the queue and, if the second region has an area less than the predetermined area, determine a number, which is obtained based on a number of persons detected by the first detection unit and a number of persons detected by the second detection unit, as the number of persons waiting in the queue.

2. The system according to claim 1, wherein, after time at determining the number of detected persons in the first region as the number of persons waiting in the queue, the determination unit determines a number, which is obtained based on a number of persons detected by the first detection unit after the time, a number of persons detected by the second detection unit after the time, and the number of the detected persons in the first region, as the number of persons waiting in the queue.

3. The system according to claim 1, further comprising a time obtaining unit configured to obtain time of passage through the first position, wherein
   if the second region has an area greater than or equal to the predetermined area and further a difference between the time of passage through the first position and time at which a person is detected from the captured image by the third detection unit is greater than or equal to a set time, the determination unit determines the number of detected persons in the first region as the number of persons waiting in the queue.

4. The system according to claim 1, wherein
   the image obtaining unit obtains the captured image and a queue captured image of the queue,
   the third detection unit detects a person from the captured image and the queue captured image,
   if the second region is greater than or equal to the predetermined area and there is no difference between the number of detected persons in the first region and a number of persons detected from the queue captured image, the determination unit determines the number of detected persons in the first region as the number of persons waiting in the queue.

5. The system according to claim 4, wherein
   the queue captured image is an image of the queue as a whole, and wherein the queue captured image is comprised of images captured by a plurality of image capturing apparatuses.

6. An information processing apparatus that determines a number of persons waiting in a queue formed between a first position and a second position, the second position corresponding to an exit of the queue, the information processing apparatus comprising a computer executing instructions that, when executed by the computer, cause the computer to function as:
   a first obtaining unit configured to obtain a result of first detection for detecting a person passing through the first position;
   a second obtaining unit configured to obtain a result of second detection for detecting a person passing through the second position;
   a third obtaining unit configured to obtain a result of third detection for detecting a person in a captured image of an area corresponding to the second position and for determining, in the captured image, a first region including a detected person and a second region including no person; and
   a determination unit configured to, if the second region has an area greater than or equal to a predetermined area, determine a number of detected persons in the first region as the number of persons waiting in the queue and, if the second region has an area less than the predetermined area, determine a number, which is obtained based on a number of persons detected by the first detection and a number of persons detected by the second detection, as the number of persons waiting in the queue.

7. The information processing apparatus according to claim 6 wherein,
   after time at determining the number of detected persons in the first region as the number of persons waiting in the queue, the determination unit determines a number, which is obtained based on a number of persons detected in the first detection after the time, a number of persons detected in the second detection after the time, and the number of detected persons in the first region, as the number of persons waiting in the queue.

8. The information processing apparatus according to claim 6, further comprising
   a time obtaining unit configured to obtain time of passage through the first position, wherein
   if the second region has an area greater than or equal to the predetermined area and further a difference between the time of passage thorough the first position and time at which a person is detected in the captured image by the third detection is greater than or equal to a set time, the determination unit determines the number of detected persons in the first region as the number of persons waiting in the queue.

9. The information processing apparatus according to claim 6, wherein the third obtaining unit obtains a result of the third detection for detecting a person from the captured image and a queue captured image of the queue, and if the second region is greater than or equal to the predetermined area and there is no difference between a number of detected persons in the first region and a number of persons detected from the queue captured image, the determination unit determines the number of detected persons in the first region as the number of persons waiting in the queue.

10. The information processing apparatus according to claim 9, wherein the queue captured image is an image of the queue as a whole, and wherein the queue captured image is comprised of images captured by a plurality of image capturing apparatuses.

11. An information processing method that determines a number of persons waiting in a queue formed between a first position and a second position, the second position corresponding to an exit of the queue, the information processing method comprising:

a first obtaining step for obtaining a result of first detection for detecting a person passing through the first position;

a second obtaining step for obtaining a result of second detection for detecting a person passing through the second position;

a third obtaining step for obtaining a result of third detection for detecting a person in a captured image of an area corresponding to the second position and for determining, in the captured image, a first region including a detected person and a second region including no person; and a determination step for determining a number of detected persons in the first region as the number of persons waiting in the queue if the second region has an area greater than or equal to a predetermined area and determining a number, which is obtained based on a number of persons detected by the first detection and a number of persons detected by the second detection, as the number of persons waiting in the queue if the second region has an area less than the predetermined area.

12. A non-transitory computer-readable storage medium storing a program causing a computer to execute a method that determines a number of persons waiting in a queue formed between a first position and a second position, the second position corresponding to an exit of the queue, the method comprising:

a first obtaining step for obtaining a result of first detection for detecting a person passing through the first position;

a second obtaining step for obtaining a result of second detection for detecting a person passing through the second position;

a third obtaining step for obtaining a result of third detection for detecting a person in a captured image of an area corresponding to the second position and for determining, in the captured image, a first region including a detected person and a second region including no person; and a determination step for determining a number of detected persons in the first region as the number of persons waiting in the queue if the second region has an area greater than or equal to a predetermined area and determining a number, which is obtained based on a number of persons detected by the first detection and a number of persons detected by the second detection, as the number of persons waiting in the queue if the second region has an area less than the predetermined area.

* * * * *